No. 646,011. Patented Mar. 27, 1900.
W. J. STERLING.
APPARATUS FOR PREVENTING PIPE CONNECTIONS FROM LEAKING.
(Application filed Feb. 19, 1900.)
(No Model.) 2 Sheets—Sheet 1.
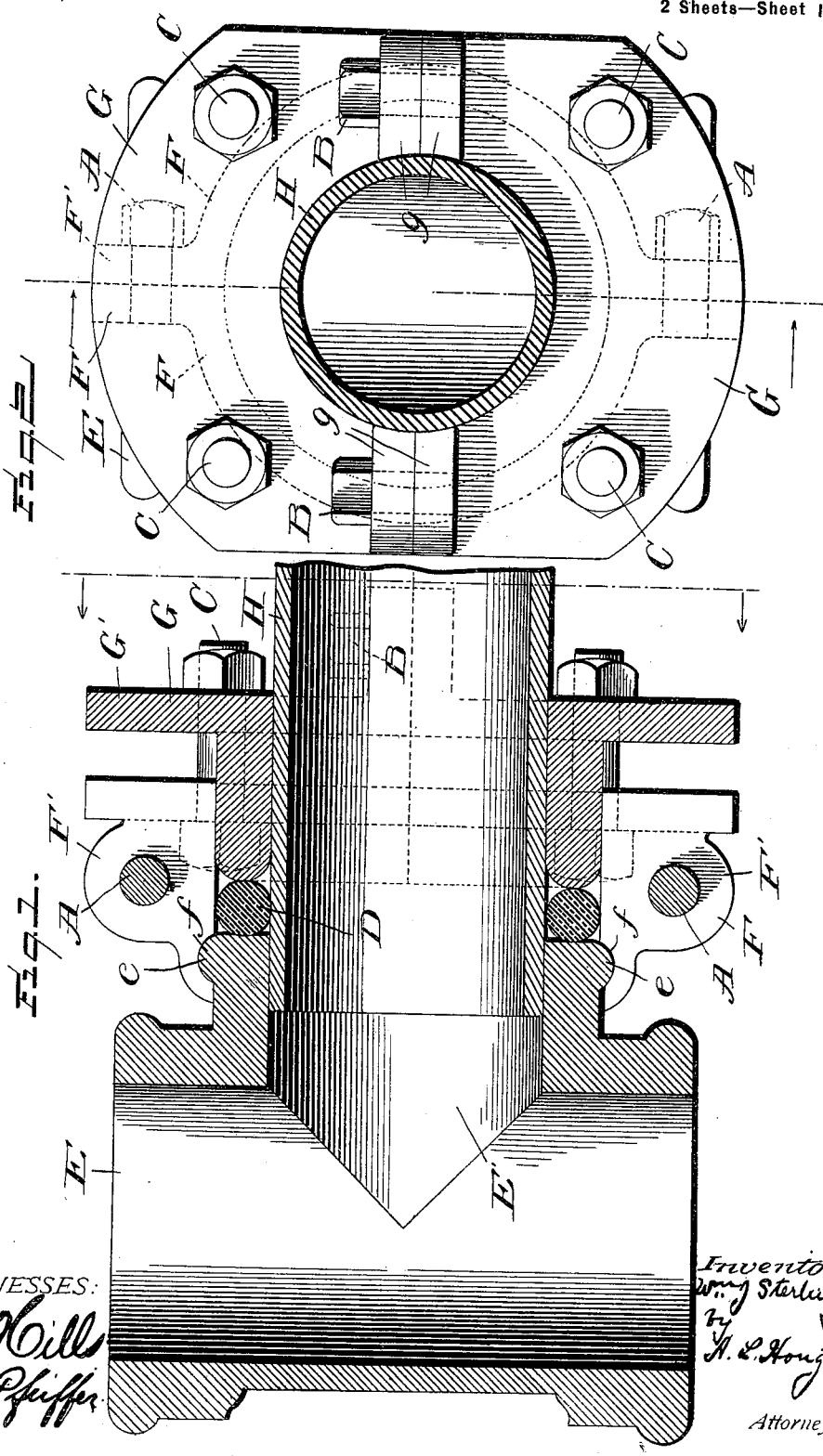

No. 646,011. Patented Mar. 27, 1900.
W. J. STERLING.
APPARATUS FOR PREVENTING PIPE CONNECTIONS FROM LEAKING.
(Application filed Feb. 19, 1900.)
(No Model.) 2 Sheets—Sheet 2.
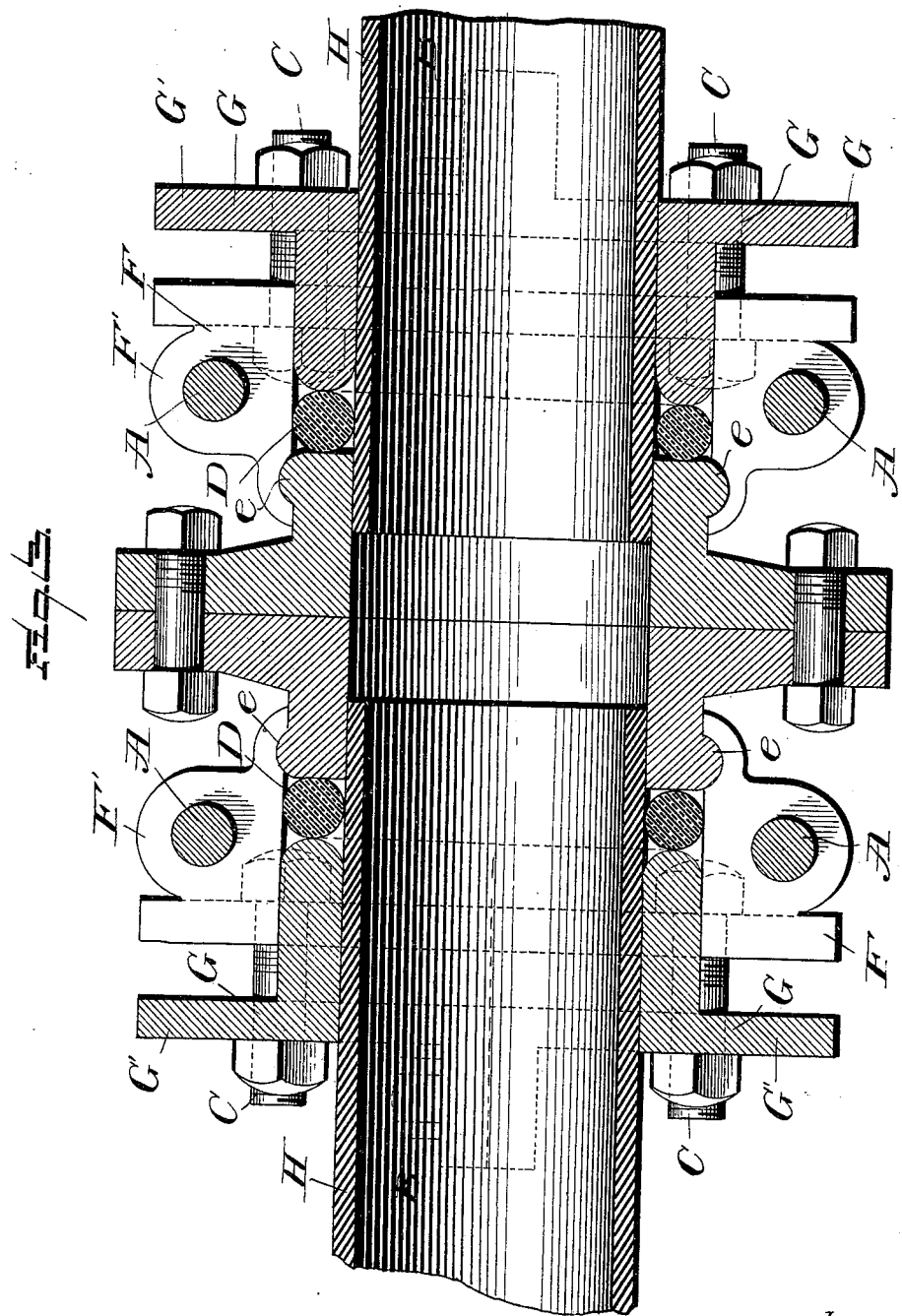
WITNESSES:
INVENTOR
BY
Attorney

UNITED STATES PATENT OFFICE.

WILLIAM JACKSON STERLING, OF PORTSMOUTH, VIRGINIA.

APPARATUS FOR PREVENTING PIPE CONNECTIONS FROM LEAKING.

SPECIFICATION forming part of Letters Patent No. 646,011, dated March 27, 1900.

Application filed February 19, 1900. Serial No. 5,809. (No model.)

*To all whom it may concern:*

Be it known that I, WILLIAM JACKSON STERLING, a citizen of the United States, residing at Portsmouth, in the county of Norfolk and State of Virginia, have invented certain new and useful Improvements in Apparatus for Preventing Pipe Connections from Leaking; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for stopping leaks in pipes which are used to convey steam, water, air, &c.; and the object of the present invention is to provide a suitable means consisting of a gland carried about a pipe and a sectional clamping member having an annular recess designed to engage over a bead of the fitting, said clamping members being held together by suitable bolts, and a gasket interposed between the end of the gland and the end of the beaded fitting, and by means of studs the gland being forced underneath the clamping members, thus compressing the gasket, so that the latter will bind tightly against the outer circumference of the pipe and the end of the fitting to which the pipe is connected.

To these ends and to such others as the invention may pertain, the same consists, further, in the novel construction, combination, and adaptation of parts, as will be hereinafter more fully described and then specifically defined in the appended claims.

My invention is clearly illustrated in the accompanying drawings, which with the letters of reference marked thereon form a part of this application, and in which—

Figure 1 is a sectional view through a fitting and my coupling attachment. Fig. 2 is a cross-sectional view through the fitting, parts being shown in elevation. Fig. 3 is a sectional view through a pipe, showing a slightly-modified form of fitting.

Reference now being had to the details of the drawings by letter, H designates a pipe, and E a union or fitting having a port E', in which said pipe is fitted. The outer wall of said port has a bead $e$, as is common in pipe-fittings.

F F designate two clamping members, which have flanges F', with threaded apertures therein. Said members, which are semicircular in outline, have annular recesses $f$ in their inner walls, which recesses are designed to receive the bead $e$ when said members are clamped over the fitting in the manner illustrated in the drawings. For clamping the members F together screws A A are provided, which are passed through the threaded apertures in the flanges F' after the members F have been adjusted in place.

The gland G, which for convenience in applying to the pipe is made up of two complemental curved sections having flanges G', is inserted between the outer circumference of the pipe H and the inner circumference of the clamping members, as shown, while studs C pass through registering and threaded apertures in the flanges G' and F'. The two sections of the glands are held to the pipe by means of bolts B, which are passed through threaded apertures in the flanges $g$ of said gland-sections.

Interposed between the inner ends of the gland-sections and the end of the beaded portion of the fitting in which the pipe H engages is a gasket D, which may be either circular in cross-section or of any other shape which may be found to be well adapted for the purpose.

In operation when the clamping members have been fastened together, with their recessed ends engaging over the bead of the fitting and the gasket and gland-sections adjusted in place by tightening the studs C, the gasket is compressed between the inner ends of the gland-sections and the end of the fitting in which the pipe engages, and the gland will be caused to bind tightly against the circumference of the pipe and the end of the fitting, thus making a steam, water, or air tight fitting.

This apparatus may be applied to all kinds of pipes used for whatever purpose, and the pipe will be protected, as well as the threads, and may be easily and quickly applied to the pipe and fitting.

In Fig. 3 I have shown the coupling attachment as applied to fittings slightly modified from the construction shown in Fig. 1.

Having thus described my invention, what I claim to be new, and desire to secure by Letters Patent, is—

1. An apparatus for preventing pipe connections from leaking, comprising, in combination with the fitting having a beaded end, a pipe connected to said fitting, a clamping member held about the pipe, a gland inserted between the clamping member and the circumference of said pipe, a gasket interposed between the end of said gland and the end of the fitting, and means for forcing the gland against the gasket and compressing the latter, as set forth.

2. An apparatus for preventing pipe connections from leaking, comprising in combination with the fitting having an annular bead about its end, a pipe connected to said fitting, a clamping member having an annular recess in its inner wall adapted to engage said bead, a gland fitted between said clamping member and the outer circumference of the pipe, a gasket interposed between the end of the gland and the end of the fitting, and studs passing through registering apertures in flanges in said clamping member and gland, as set forth.

3. An apparatus for preventing pipes from leaking, comprising in combination with a fitting having a bead about its end, the pipe connected to said fitting, two complemental clamping members having annular recesses in their inner walls designed to fit over said bead, screws passing through flanges on said members, for holding the latter to the bead, flanged gland-sections interposed between the inner circumferences of the clamping members and the outer circumference of said pipe, and studs passing through registering threaded apertures in flanges of the clamping members and gland-sections, as shown and described.

In testimony whereof I affix my signature in presence of two witnesses.

WILLIAM JACKSON STERLING.

Witnesses:
H. P. McCOY,
JNO. E. MANNING.